(12) United States Patent
Lin

(10) Patent No.: US 7,033,223 B1
(45) Date of Patent: Apr. 25, 2006

(54) SIMULATED MINI SD MEMORY CARD CONVERTER

(75) Inventor: Chih-Chien Lin, Taipei Hsien (TW)

(73) Assignee: Chant Sincere Co., Ltd., Taipei Hsien (TW)

( * ) Notice: Subject to any disclaimer, the term of this patent is extended or adjusted under 35 U.S.C. 154(b) by 0 days.

(21) Appl. No.: 11/082,843

(22) Filed: Mar. 18, 2005

(51) Int. Cl.
*H01R 13/627* (2006.01)

(52) U.S. Cl. .................. 439/630; 439/945; 439/946

(58) Field of Classification Search ................ 439/630, 439/945, 76.1, 946; 361/737
See application file for complete search history.

(56) References Cited

U.S. PATENT DOCUMENTS 5,038,250 A * 8/1991 Uenaka et al. .............. 361/737
6,224,391 B1 * 5/2001 Horie et al. ................. 439/64
6,932,623 B1 * 8/2005 Lai ............................ 439/76.1

* cited by examiner

*Primary Examiner*—Phuong Dinh
(74) *Attorney, Agent, or Firm*—Bacon & Thomas, PLLC

(57) ABSTRACT

A simulated Mini SD memory card converter comprises an upper cover, a conducting member and a lower cover. The upper cover and the lower cover are engaged to form a combined structure resembling a Mini SD memory card, which structure has a main opening at a front end thereof and an insertion space therein for housing a Trans Flash memory card. A plurality of conducting terminals is enclosed in the lower cover. The rear end of said lower cover is further provided with a second opening corresponding to a terminal of the conducting member, whereby a front terminal of each of the conducting terminals is connected to the conducting member, and the conducting member further includes wirings to the second opening.

8 Claims, 7 Drawing Sheets

SIMULATED MINI SD MEMORY CARD CONVERTER

BACKGROUND OF THE INVENTION (a) Field of the Invention

The present invention relates to memory card converters, and more particularly to a simulated Mini SD memory card converter for coupling a new, small-sized Trans Flash memory card to a Mini SD memory card slot.

(b) Description of the Prior Art

To retrieve data from a Trans Flash memory card, a user has to insert it into a corresponding slot on a computer device. However, the majority of the computer devices in the market, such as desktop computers, notebook computers, palm computers, pocket computers, personal digital assistants (PDAs), digital cameras, mobile phones, electronic dictionaries and MP3 players, are not provided with a slot for a Trans Flash memory card. Therefore, the promotion and utilization of the Trans Flash memory card are limited. The present invention allows the connection of a Trans Flash memory card to a computer device through a Mini SD card slot.

SUMMARY OF THE INVENTION

The primary objective of the present invention is to provide a simulated Mini SD memory card converter for coupling a new, small-sized Trans Flash memory card to a Mini SD card slot, whereby a Trans Flash memory card, after being inserted into the simulated Mini SD memory card converter, can be used with an SD card connector or a multi-purpose card reader. Therefore, the limitations of Trans Flash memory cards can be largely reduced.

The various objects and advantages of the present invention will be more readily understood from the following detailed description when read in conjunction with the appended drawings.

DETAILED DESCRIPTION OF THE PREFERRED EMBODIMENTS

Figure 1:
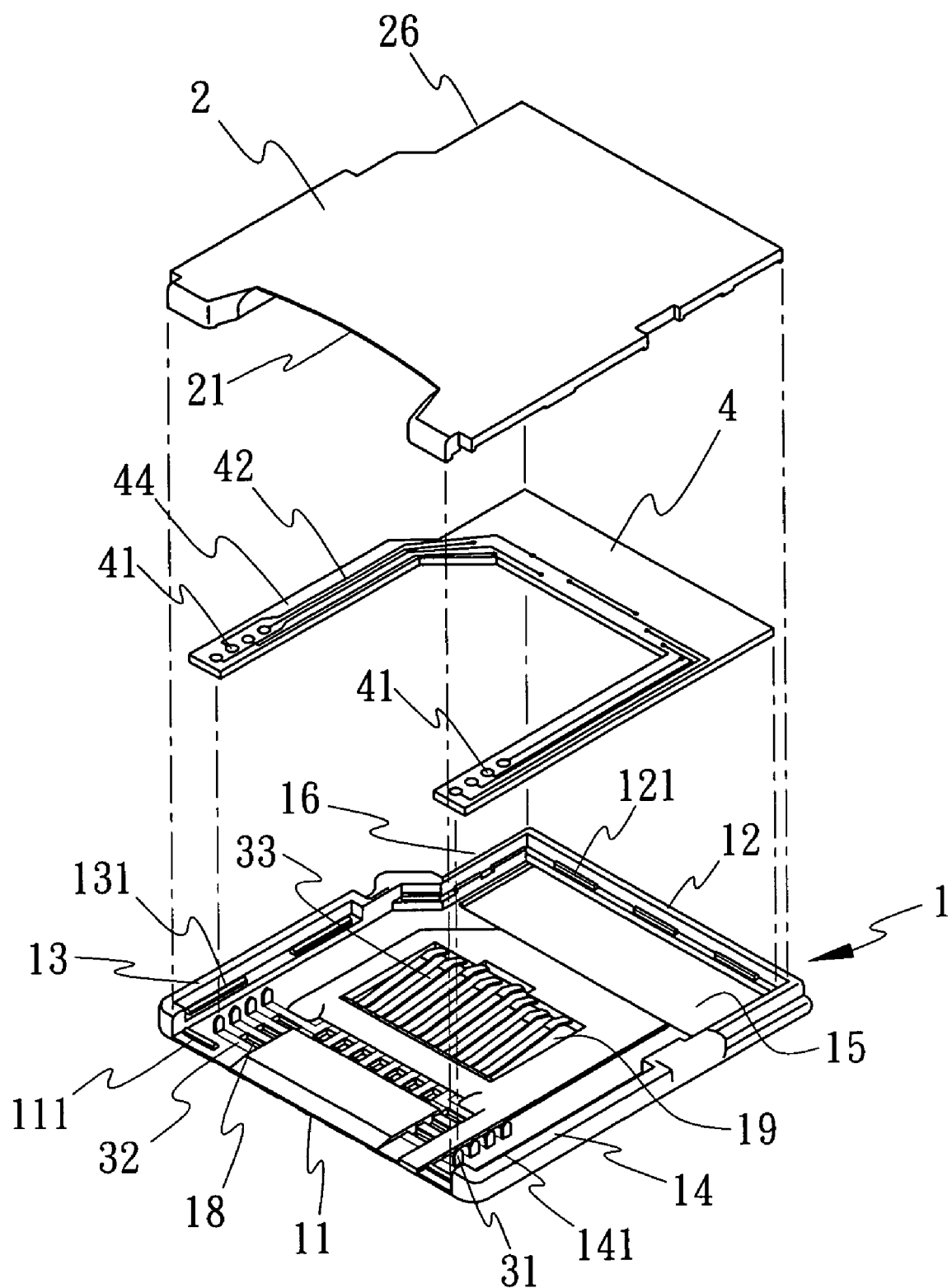
FIG. 1 is an exploded perspective view of a simulated Mini SD memory card converter according to the present invention.
Figure 2:
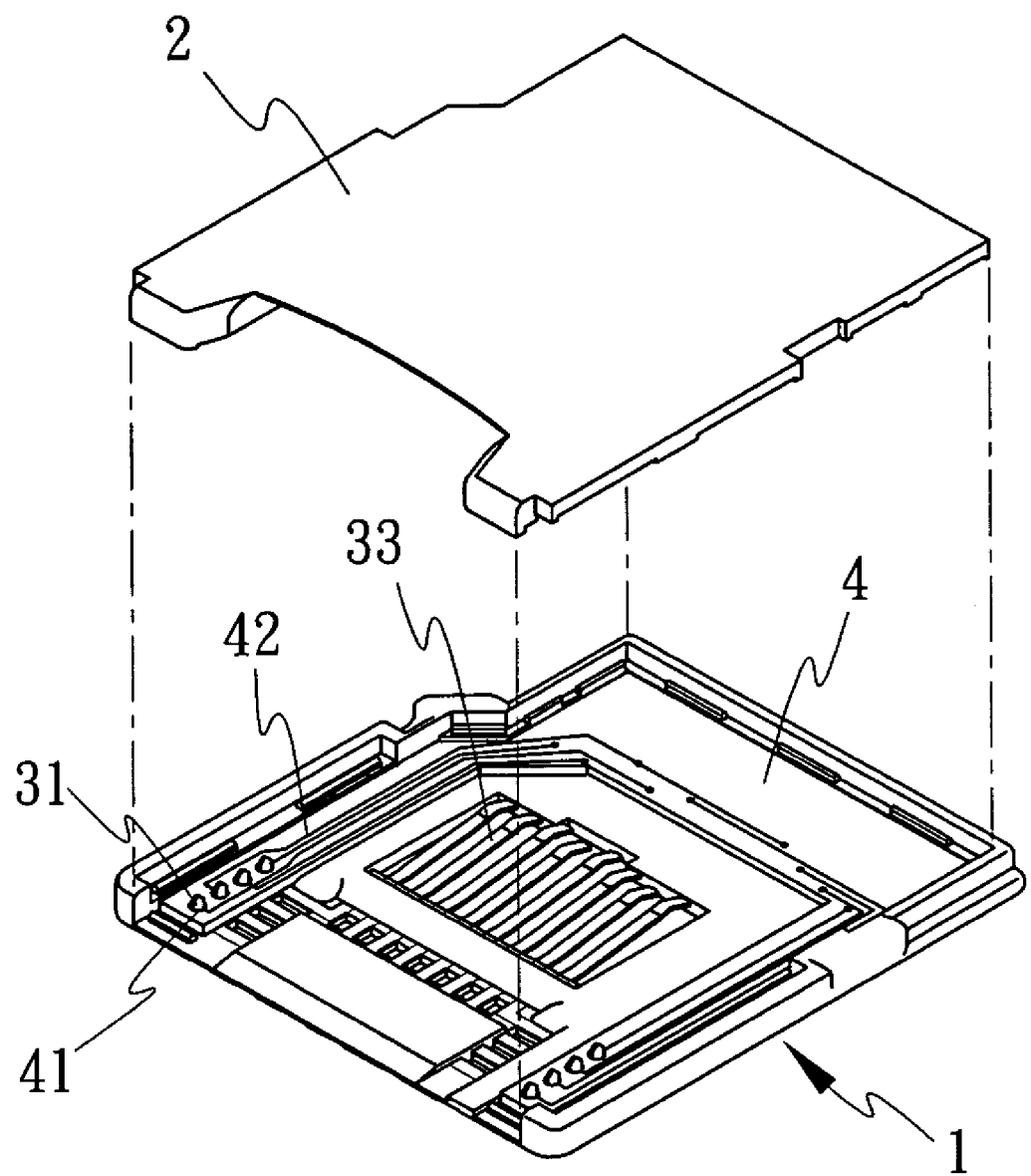
FIG. 2 is a perspective view of the simulated Mini SD memory card converter in FIG. 1 wherein the upper cover is not engaged.
Figure 3:
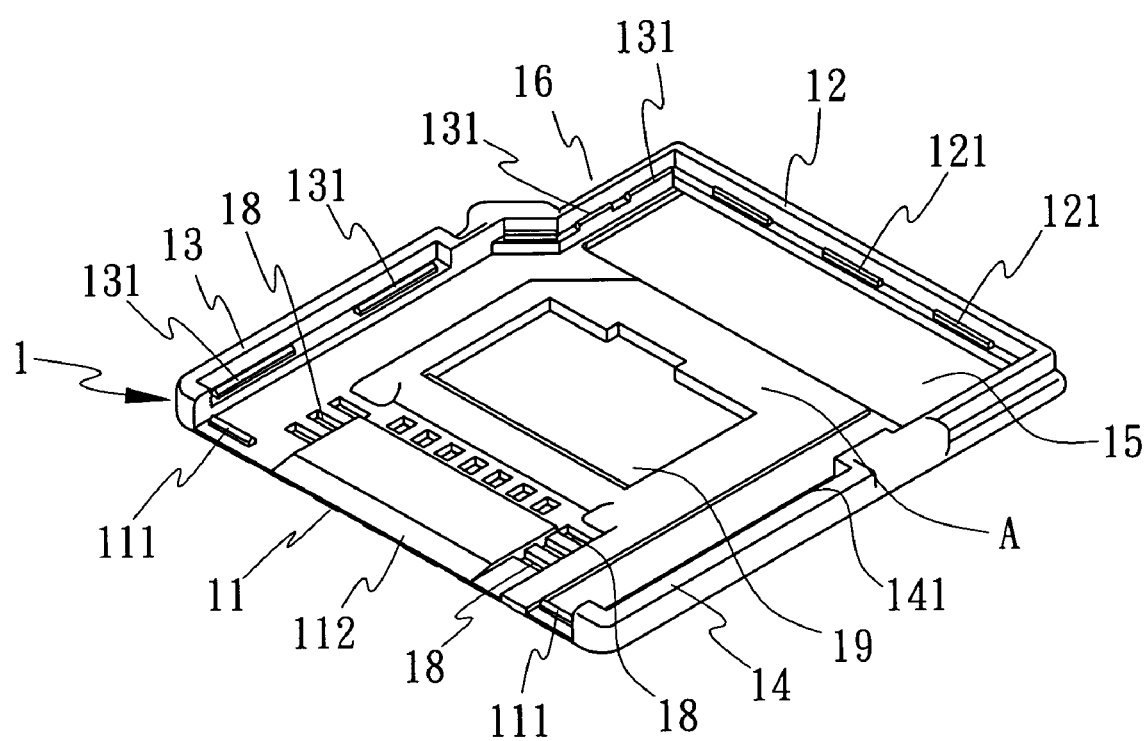
FIG. 3 is a perspective view of the lower cover of the simulated Mini SD memory card converter in FIG. 1 wherein the conducting terminals are not included.
Figure 8:
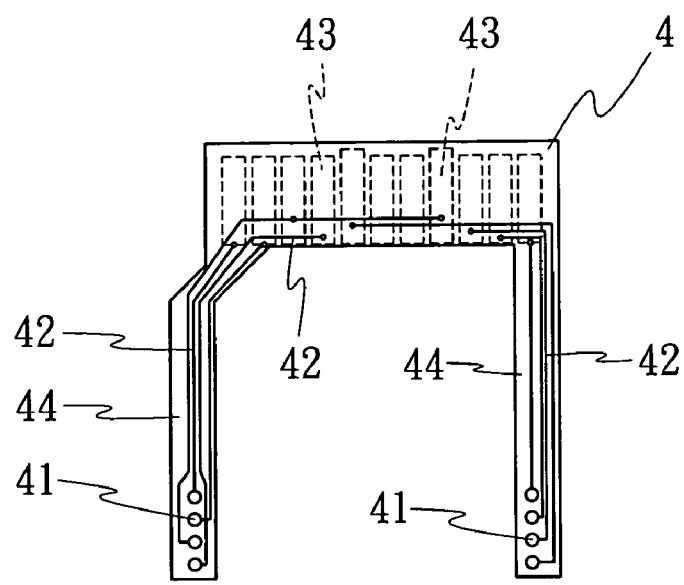
FIG. 8 is a top view of the conducting terminals of the simulated Mini SD memory card converter in FIG. 1.
Figure 9:
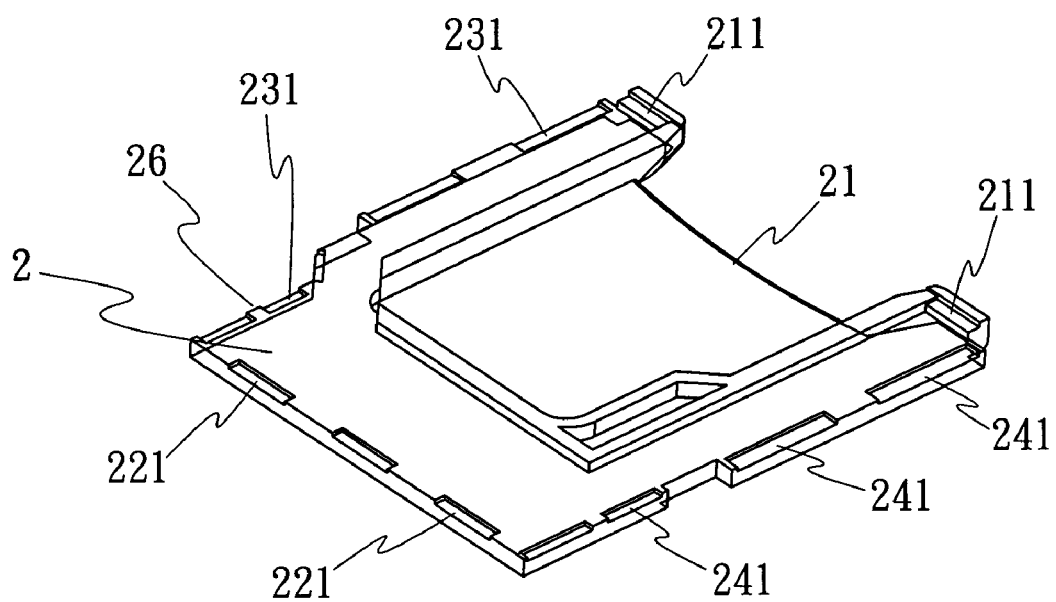
FIG. 9 is a perspective view of the upper cover in FIG. 1 being flipped over.

Referring to FIGS. 1 to 11, a simulated Mini SD memory card converter according to the present invention comprises a lower cover 1 and an upper cover 2, respectively shown in FIGS. 1, 3, 9. The simulated Mini SD memory card converter further comprises a plurality of conducting terminals 3 and a conducting member 4, respectively shown in FIGS. 4 and 8. As the lower cover 1 and the upper cover 2 are combined, the combined structure resembles a Mini SD card, whereas the internal structure thereof is different.

Figure 10:
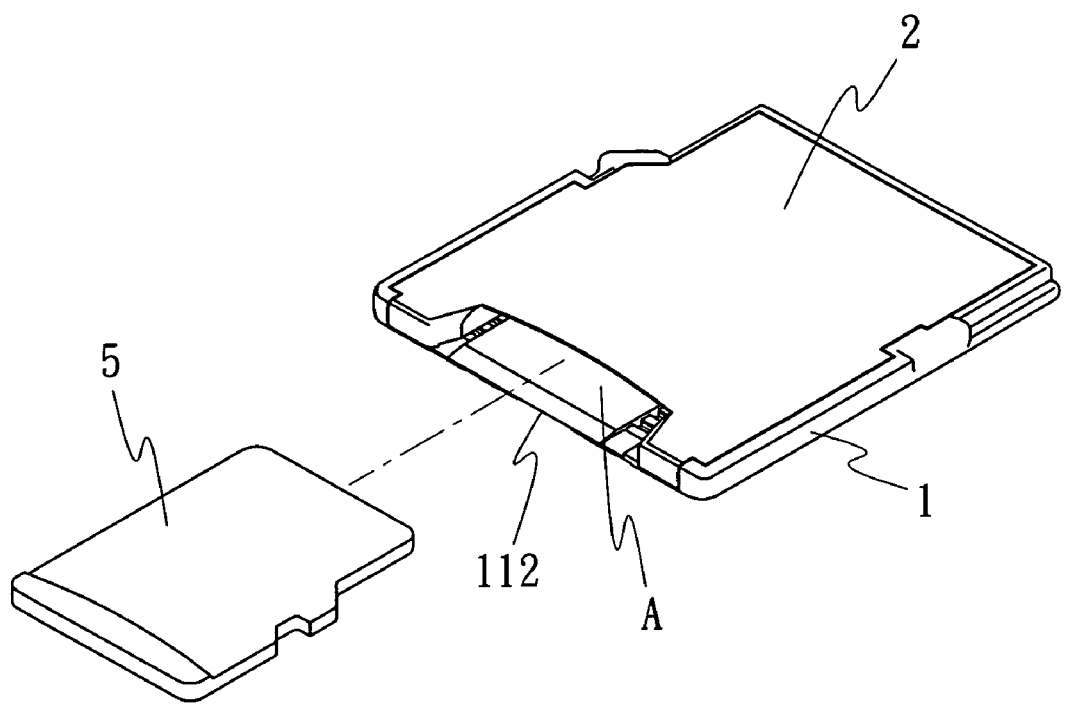
FIG. 10 shows the state of the simulated Mini SD memory card converter before a Trans Flash memory card is inserted.

The conducting terminals 3 are housed in the lower cover 1 to form an integral body wherein a space A is reserved for the insertion of a Trans Flash memory card 5, as shown in FIG. 10. There are eight conducting terminals 4, each having a pointed upright tip 31. Each of the conducting terminals 4 is a bent metallic strip having a front terminal 32 and a rear terminal 33; the front terminal 32 and the rear terminal 33 are perpendicular to each other. The rear terminals 33 are longer than the front terminals 32. Each of the rear terminals 33 is bent upward to form a flexible conducting arm. A major portion of each front terminal 32 and a minor portion of each rear terminal 33 are concealed under the lower cover 1; the area where the front terminals 32 and the rear terminals 33 are concealed is called the enclosed portion 34. The enclosed portion 34 is located in the lower cover 1 near the front end thereof. The conducting terminals 3 are bridged by a connecting strip 35 and a base strip 36. The conducting terminals 3 are not necessarily to be right-angled member; they can also be arced.

Figure 4:
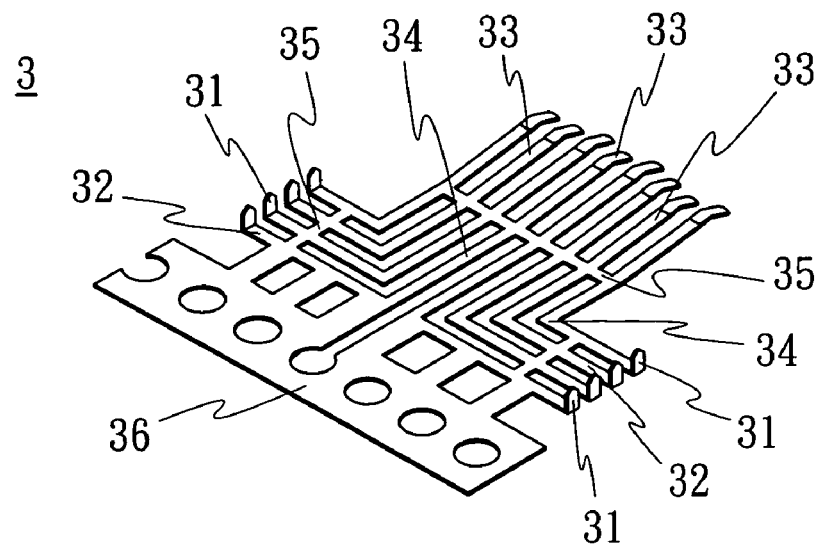
FIG. 4 is a perspective view of the set of conducting terminals in the simulated Mini SD memory card converter in FIG. 1 including a base strip.
Figure 5:
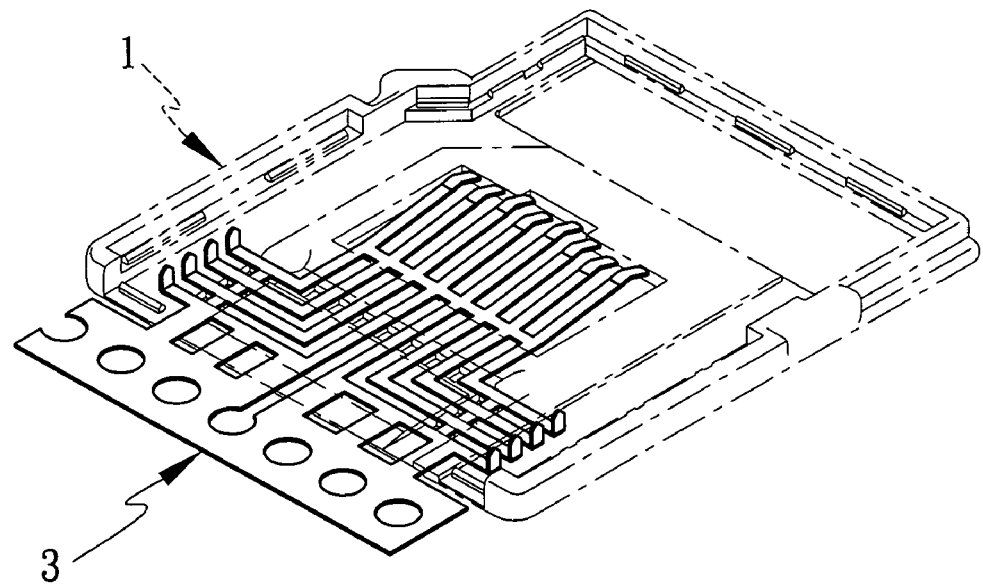
FIG. 5 indicates the set of conducting terminals in FIG. 4 enclosed in an envelope.
Figure 6:
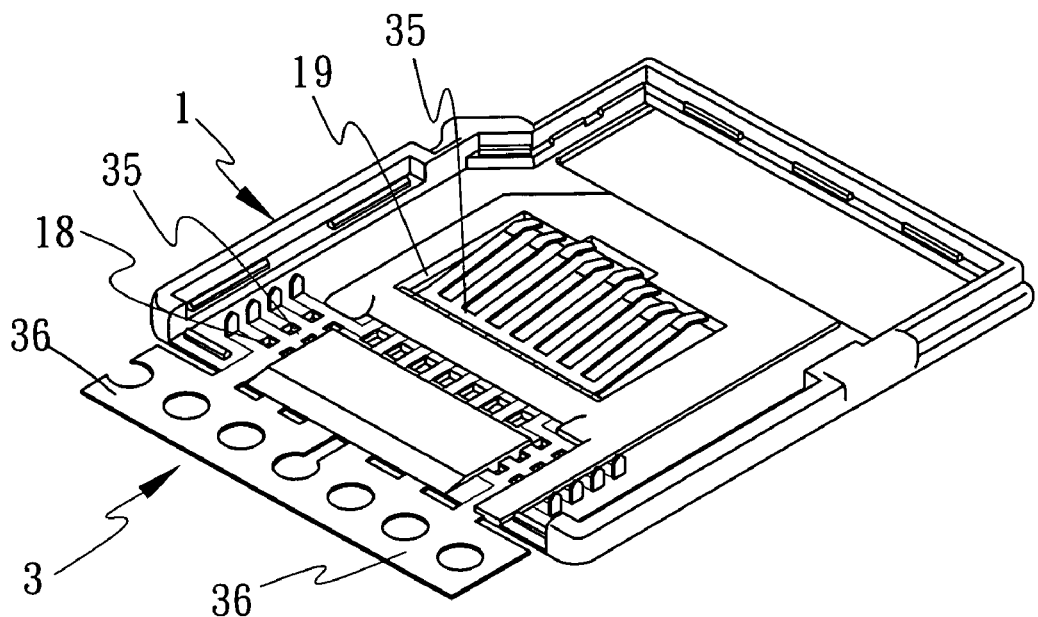
FIG. 6 is a perspective view of the simulated Mini SD memory card converter in FIG. 1 wherein the conducting terminals are disposed within the lower cover, with its base strip attached
Figure 7:
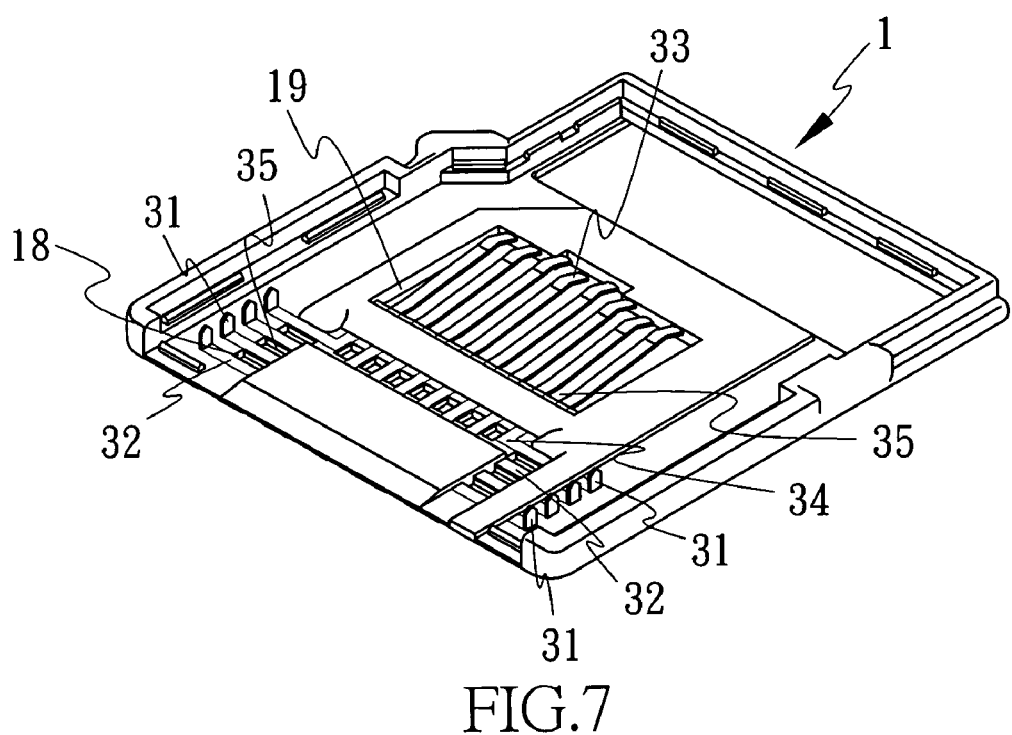
FIG. 7 is a perspective view of the simulated Mini SD memory card converter in FIG. 1 wherein the conducting terminals are disposed within the lower cover.

Referring to FIGS. 4 and 5, the front terminals 32 and the rear terminals 33 of the conducting terminals 3 are each provide with a connecting strip 35. The rear end of the row of the front terminals 32 is further provided with a base strip 36. The connecting strips 35 and the base strip 36 are temperature parts which will be punched away during the process of combining the conducting terminals 3 and the lower cover 1. The connecting strips 35 are for retaining each of the conducting terminals 4 in a fixed arrangement. The lower cover 1 further includes a row of small holes 18 and a row of big holes 19 respectively corresponding to the front terminals 32 and the rear terminals 33, whereby the conducting terminals 3 will be retained by the small and big holes 18, 19. This a special production means of this present invention, called pre-confined injection molding, whereby the arrangement of the conducting terminals 3 will not be disturbed by the impact of the plastic body of the lower cover 1 during the manufacturing process, largely increasing the rate of success.

The rear end of the lower cover 1 is provided with a main opening 15 that is aligned with the conducting member 4. The conducting member 4 is a U-shaped PC circuit board, as shown In FIG. 8. Each of the feet 44 of the conducting member 4 has a row of four through holes 41, corresponding to two opposite halves of the front terminals 32. Each of the pointed upright tips 31 of the conducting terminals 3 passes through a corresponding one of the through holes 41. Each of the feet 41 has a plurality of wires 42 connecting the pointed upright tips 31 to corresponding terminal plates 43 on the conducting member 4. As shown in the figure, there are eleven terminal plates 43, which number is for the spec of a Mini SD memory card.

The front ends of the lower cover 1 and the upper cover 2 are respectively provided with main openings 11, 21. The rear ends of the lower cover 1 and the upper cover 2 are respectively provided with deficit corners 16, 26. Further, the main opening 11 of the lower cover 1 has a slope 121, and the main opening 21 of the upper cover 2 is curved inward.

Except for the front end, the other sides of the lower cover 1 are respectively provided with a rear flange 12, left flange 14 and a right flange 13 for the embedment of the upper cover 2 with the lower cover 1. That is, the right, left and rear sides of the upper cover 2 will be concealed by the flanges around the lower cover 1. The flanges 12, 13 and 14 are further provided with a plurality of projections 121, 131, 141, and the sections by the main opening 11 are provided with projections 111, whereby the projections 111, 121, 131, 141 can be engaged with corresponding depressions 211, 221, 231, 241 formed around the lower surface of the upper cover 2, and whereby an ultrasonic welding or a glue connection can be applied.

Figure 11:
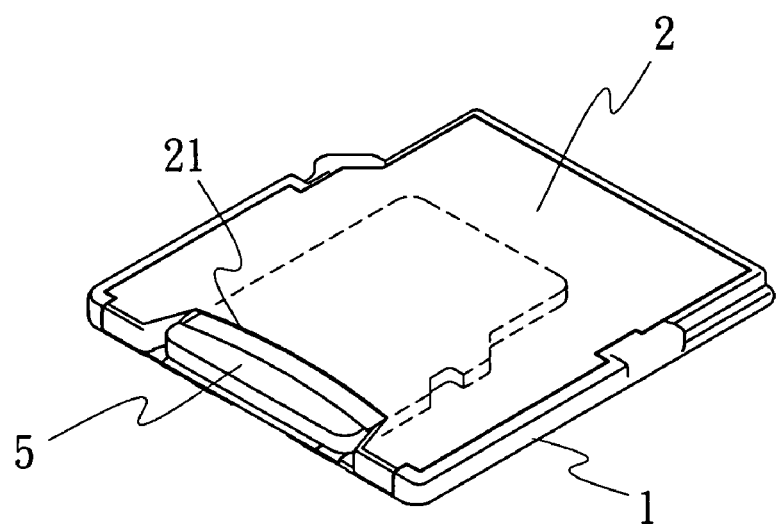
FIG. 11 shows the state of the simulated Mini SD memory card converter after a Trans Flash memory card is inserted.

The above structure of a converter is particularly suitable for precision and easy assembly of a set of conducting terminals, a lower cover and an upper cover. As shown in FIGS. 10 and 11, after being inserted, the pins of a Trans Flash memory card are connected with the flexible conducting arms of the rear terminals of the conducting terminals, and then to the where the connection pins of a Mini SD card are simulated. Therefore, a Trans Flash memory card will be accepted by electronic devices that are compatible with Mini SD cards, significantly enlarging the applicability of the Trans Flash memory card.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A simulated Mini SD memory card converter, comprising:
   an upper cover;
   a conducting member; and
   a lower cover capable of being engaged with said upper cover to form a combined structure resembling a Mini SD memory card, said combined structure having a main opening at a front end thereof and an insertion space therein for housing a Trans Flash memory card, a plurality of conducting terminals being enclosed in said lower cover, said main opening being composed of a main opening on said upper cover and a main opening on said lower cover, a rear end of said lower cover being provided with a second opening corresponding to a terminal of said conducting member, whereby a front terminal of each of said conducting terminals is connected to said conducting member, said conducting member further including wirings to said second opening.

2. The simulated Mini SD memory card converter of claim 1 wherein said conducting member is a U-shaped PC circuit board having two feet each provided with a plurality of thought holes and a plurality of terminal plates, said terminal plates being connected to said through holes by corresponding wires.

3. The simulated Mini SD memory card converter of claim 2 wherein said terminal plates are arranged according to the pin structure of a Mini SD card.

4. The simulated Mini SD memory card converter of claim 1 wherein the border of said lower cover is provided with a plurality of projections, and wherein said upper cover is provided with a plurality of corresponding depressions capable of being engaged with said projections.

5. The simulated Mini SD memory card converter of claim 4 wherein a right side, a left side and said rear end are each provided with a flange having a retaining projection.

6. The simulated Mini SD memory card converter of claim 1 wherein said main opening of said upper cover is curved inward.

7. The simulated Mini SD memory card converter of claim 1 wherein said main opening of said lower cover has a slope.

8. The simulated Mini SD memory card converter of claim 1 wherein said lower cover further includes a plurality of through holes for retaining said conducting terminals confined therein, and wherein said conducting terminals are attached with connecting strips and a base strip for maintaining the spatial arrangement of said conducting terminals during a process of combining said lower cover and said conducting terminals, said connecting strip and said base strip being punched away after said process.

* * * * *